United States Patent [19]
Nitsche et al.

[11] Patent Number: 6,014,798
[45] Date of Patent: Jan. 18, 2000

[54] METHOD AND DEVICE FOR MANUFACTURING LEAD PLATES FOR LEAD/ACID BATTERIES

[75] Inventors: Werner Nitsche, Lippstadt; Norbert Lahme, Brilon, both of Germany

[73] Assignees: Accumulatorenwerke Hoppecke Carol Zoellner; Sohn GmbH & Co. KG, both of Germany

[21] Appl. No.: 09/003,053

[22] Filed: Jan. 5, 1998

[51] Int. Cl.[7] .............................. H01M 4/20; H01M 4/21
[52] U.S. Cl. .................................. 29/2; 429/225
[58] Field of Search .......................... 29/2, 623.1, 623.5; 429/225, 226, 227, 228

[56] References Cited

U.S. PATENT DOCUMENTS

| 2,130,246 | 9/1938 | Olcott et al. |
|---|---|---|
| 2,656,399 | 10/1953 | Hindall et al. |
| 3,899,349 | 8/1975 | Yarnell. |
| 4,606,982 | 8/1986 | Nelson et al. ............................. 429/59 |
| 4,713,304 | 12/1987 | Rao et al. |
| 5,577,908 | 11/1996 | Glascock ................................. 432/239 |

FOREIGN PATENT DOCUMENTS

| 1111684 | 9/1958 | Germany. |
|---|---|---|
| 2828455 | 1/1980 | Germany. |

*Primary Examiner*—Maria Nuzzolillo
*Assistant Examiner*—Jonathan Crepeau
*Attorney, Agent, or Firm*—Robert W. Becker & Associates

[57] ABSTRACT

A method for manufacturing lead plates for a lead/acid battery includes the step of providing lead electrode grates and filling an active paste into the lead electrode grates to form filled lead plates. Subsequently the lateral surfaces of the filled lead plates are subjected to a continuous processing sequence of less than 6 hours under preselected processing parameters for time, temperature, humidity, and air movement. The processing sequence includes a curing step in which moisture is added to reach a first humidity value, a predrying step for reducing the amount of free lead in the active paste at a second humidity value that is lower than the first humidity value, and a final drying step.

15 Claims, 1 Drawing Sheet

METHOD AND DEVICE FOR MANUFACTURING LEAD PLATES FOR LEAD/ACID BATTERIES

BACKGROUND OF THE INVENTION

The present invention relates to a method and a device for manufacturing lead plates for lead/acid batteries. For manufacturing lead/acid batteries it is known to produce first substantially grate-shaped lead electrodes. The resulting plates with predetermined dimensions are then provided with a so-called active paste which is pressed into the mesh structure of the grate and is subsequently subjected to a curing and drying process. In a known manner, the plates are combined by interposition of separating or parting materials to form stacks. A certain number of plates forms a cell block of the battery. The plates forming a cell block are electrically connected to one another. A plurality of cell blocks are then inserted into a corresponding housing and are also correspondingly electrically connected. Finally, the positive or negative pole is connected. The battery is then to be filled with acid and charged. The storage and transport can be performed at different stages of this manufacturing process, for example, the plates can first be charged in a tank, and then washed and dried and in this state assembled to form the lead/acid battery. The lead/acid battery is then in a non-filled, charged state. However, batteries can also be transported in the charged and filled state.

The active material to be introduced into the grate-shaped electrode is a paste-like material that must be cured by releasing moisture. This is acheived by slow moisture release over a period of hours. In general, a curing process can take up to 48 hours and is performed conventionally in so-called curing chambers.

The curing requirements present obstacles to attempts in regard to automation of the manufacturing process of lead/acid batteries especially in on-line operation.

It is conventional to apply the active paste to the lead electrode, to stack the thus-treated electrodes, and to store the lead electrodes for the curing process. The cured and dried electrodes are then reintroduced into the manufacturing process, separating material/separators are applied, and the lead plates stacked. The manufacture of the lead/acid battery is then completed as disclosed above. When the curing process is shortened or is incomplete, the electrical properties of the lead/acid battery can be considerably impeded.

Even though different suggestions for the integration of the manufacturing process for lead plates into the entire manufacturing process for the lead/acid batteries have been made, at present no method is known with which a considerable reduction of the curing time of positive and/or negative plates is possible without compromising the plate quality and the uniformness of the plate quality.

It is therefore an object of the present invention to provide a method for manufacturing lead plates for lead/acid batteries which method, while insuring a uniform and excellent plate quality, results in a considerable reduction of the curing time and thus allows integration of the lead plate manufacturing process into a continuous manufacture of the batteries.

Furthermore, it is an object of the present invention to provide a device for manufacturing lead plates for lead/acid batteries which is suitable for performing the aforementioned method.

SUMMARY OF THE INVENTION

The method for manufacturing lead plates for a lead/acid battery according to the present invention is primarily characterized by:

A) providing lead electrode grates;
B) filling an active paste into the lead electrode grates to form filled lead plates;
C) sequentially subjecting both lateral surfaces of the filled lead plates to a continuous processing sequence of less than 6 hours under preselected processing parameters for time, temperature, humidity, and air movement, wherein the processing sequence comprises:
  C1) a curing step in which moisture is added to reach a first humidity value;
  C2) a pre-drying step for reducing the amount of free lead in the active paste at a second humidity that is lower than the first humidity value of step C1);
  C3) a final drying step.

Advantageously, the method further includes the step of applying a climate-active membrane to the lateral surface of the lead plates before carrying out step C).

In step C1) no air movement or air flow is produced.

Advantageously, step C1) includes introducing saturated steam from below and the first humidity value is almost 100%.

Preferably, step C1) is carried out for one hour at temperatures between 50° and 95° C. and with direct moisture supply.

Step C2) is carried out for less or equal to 3 hours at low humidity with air movement.

Step C3) is carried out for less than 60 minutes with a directed air movement of 0.5 to 10 m/sec. and a temperature of 40° to 90° C.

The directed air movement is preferably 2 to 3 m/sec. and the temperature is 80° C.

Expediently, in step C) the lead plates are guided through climate-controlled areas in which steps C1), C2), and C3) are performed.

Advantageously, the step C) includes transporting the lead plates by a transport device, and the processing times of step C1), C2), and C3) are defined by a length of a travel path and a transport speed through the climate-controlled areas.

Advantageously, the method further includes the step of arranging the lead plates parallel to one another and spaced to one another in packages before carrying out step C). Expediently, the method further includes the step of applying a climate-active membrane to the lateral surfaces of the lead plates before carrying out step C), wherein the climate-active membranes are battery separators.

The battery separators consist preferably of a polyethylene foil (PE) and are in the form of a sheet or a pocket.

The method may also include the step of moistening the membranes before step C1). Advantageously, the method includes the step of arranging the number of lead plates required for a battery in a package before or after step C).

The present invention also relates to a device for manufacturing lead plates for lead/acid battery, wherein the lead electrode grates are filled with an active paste to form green lead plates to be cured. The inventive device is primarily characterized by:

at least three climate-controlled, connected chambers for curing the green lead plates;
an inlet for introducing the green lead plates into a first one of the climate-controlled chambers;
a transport device for moving the lead plates through the at least three climate-controlled chambers for curing;
a removal device for removing the cured lead plates;
a control device for controlling temperature, humidity, and air movement in the at least three climate-controlled chambers.

The transport device preferably comprises a circulating transport unit and transport boxes connected thereto for receiving a plurality of lead plates in a parallel and spaced-apart arrangement.

The device may further comprise air vents for producing a directed air movement or air flow within at least one of the at least three climate-controlled chambers.

The present invention also relates to a lead plate manufactured according to the inventive method.

According to the present invention a method is suggested wherein the substantially grate-shaped lead electrode plates are filled with a paste-like active material, the green electrode plates are subjected to a curing process in which moisture is added, a pre-drying process for reducing the free lead within the paste-like material at a humidity that is reduced relative to the humidity in the curing process, and subsequently a final drying process. During the three-step process pre-selected parameters with regard to time, humidity, temperature, and/or relative air movement (air flow) are controlled and the process requires a time period of less than 6 hours in a continuous processing sequence within 3 sequentially arranged areas. During the processing steps both lateral plate surfaces are exposed in order to ensure a uniform treatment.

With the inventive method the entire lead plate curing and drying process is divided into individual phases which are optimized with respect to the climate conditions, i.e., preferably humidity, temperature, and/or relative air flow, and, if necessary, also with respect to other climate conditions and with respect to the time period for exposing the lead plates to the respective climate conditions. It is thus possible to optimize each method step with regard to the desired result and, especially, within the shortest possible amount of time while achieving a uniform product quality that is reproducible. The division of the processing sequence into a curing process, a pre-drying process, and a final drying process, wherein the climate conditions and the time of exposure for each of the three phases is optimized, allows for a total processing time which according to certain conditions may be less than four hours. Thus, the lead plate manufacturing process can be integrated into the industrial lead/acid battery manufacturing process, and, in particular, can be embodied as a continuous process with reproducible results and high product quality.

According to an especially advantageous suggestion, the plate surfaces, before beginning the curing process, are provided with a climate-active membrane. A climate-active membrane in the context of the present invention is to be understood as a material for covering the lateral surfaces of the lead plates which material allows transport of moisture and also storage of moisture and protects the plate surface against a direct air movement or air flow. Thus, at the plate surface a microclimate is produced which with respect to temperature, humidity, and air movement can be exactly controlled and adjusted. These membranes can also be advantageously used to ensure the spacing between the surfaces of neighboring plates so that an unhindered air flow between the plates as well as an unhindered formation of desired climatic conditions between the plates is ensured.

With respect to the curing process, certain climatic conditions and the time of exposure are suggested according to the present invention whereby it is inventively and advantageously suggested that no air movement or air flow is produced during the curing process. Even though the plates are moved according to a corresponding method control through respectively climate-controlled areas so that due to the movement of the plates themselves a relative movement of the plates to the air is produced, this movement is negligible. In the context of the invention the air should not be guided with a slight flow but, instead, should be substantially stagnant. In an advantageous manner, an atmosphere of almost 100% humidity should be provided for which purpose saturated steam is being used. The saturated steam is advantageously guided through bottom inlets into the corresponding climate-controlled area chamber. The temperature should be between 50° to 95° C. The curing process in which the humidity contents in the paste-like material of the plate is to be adjusted to preferably 9% to 10%, is maintained for approximately 1 hour. Advantageously, the plate can be supplied with more moisture during the curing process. During the curing process defined chemical compositions and crystal sizes are formed.

The pre-drying step is a method step in which the free lead in the paste-like material of the plates is reduced. This, according to a preferred embodiment of the invention, is acheived by producing a circulating air flow, preferably with fresh air supply. Advantageously, it is suggested within the invention to perform the pre-drying process at temperatures between 50° and 80° C. The time period, according to one suggestion of the present invention, can be up to 2.5 hours. A circulating air flow and temperatures are to be selected such that the humidity contents of the paste slowly is reduced from a range of 9%–10% to preferably 4%.

In the final drying process a temperature is adjusted and an air flow between the plates is produced. The temperature is advantageously about 80° C. The air flow velocity is suggested to be preferably 2 to 3 m/sec.

It is especially advantageous to direct the air flow such that at least during the step of final drying the air flows directly along the surfaces, respectively, of the membranes.

The final drying process can be performed according to an advantageous embodiment of the invention for approximately 30 minutes.

The inventive method has advantages relative to the prior art in two respects, i.e., it allows for a considerable time saving and, on the other hand, it produces reproducible uniform results and high product quality. While curing processes according to the prior art take 12 to 18 hours with subsequent drying steps of 2 to 3 days, the inventive method allows processing times of approximately 4 hours in the most advantageous cases. Of course, variations may also lead to longer processing times which, however, are not within the range of days as in the prior art.

The invention has the further advantage that the plate quality relative to the prior art shows an improved grate/paste connection and an improved cured paste stability. The lead plates produced according to the inventive method are therefore also new.

According to the invention, the lead plates are guided through climate-controlled areas (chambers) whereby the exposure time is determined by the combination of travel distance and travel speed. Advantageously, the plates are guided by a transporting device one after another through the sequentially arranged climate-controlled areas. By this measure, a rearrangement of the plates between different method steps is no longer needed. Furthermore, it is important that the plates are moved in a controlled manner with respect to exposure time between the individual climate-controlled areas for producing reproducible results.

The plates can be treated as individual plates or can be arranged in packages and treated as packages. It is possible to arrange groups of negative, positive, or groups of mixed (negative and positive) lead plates whereby the mixed groups can also be arranged so as to provide complete assembly packages for the lead/acid batteries. In an advantageous manner, the plates are provided with climate-active membranes, for example, formed by moistened spacers, preferably conventional battery separators. This measure, which is conventional in the lead plate manufacturing process, can be advantageously used in connection with the present invention in a different form. It is thus suggested to prepare pockets of the separator material, preferably polyethylene foil (PE foil) into which the plates are inserted. The polyethylene foil has ribs which provide spacers for neighboring plates. Advantageously, the PE foil is provided with embedded silica gel so that the PE foil has hygroscopic properties. The use of the pockets itself as well as the use of the hygroscopic properties have positive effects on the inventive method. Advantageously, it is suggested with the invention that the separators are moistened. For example, the green lead plates to which the paste has been applied are placed into the pockets and are immersed together with the pockets in a liquid bath. The presoaked units are then treated. The moistened separator can supply further moisture to the plate during the curing process. On the other hand, the separator material during the final drying step of the plate can remove additional moisture from the plate. By using the separator material at the plate surface, a microclimate is in fact produced in order to treat the plate by providing extra moisture, acting in a drying fashion, or providing other climatic conditions.

When producing stacks of spaced plates it is sufficient when one type of plate, for example, every other plate is placed into a pocket or provided with separator material.

The use of separator material provided with ribs and produced in the form of pockets or individual separators furthermore facilitates the introduction or guiding of air flow. The air flow is to be directed and adjusted such that the pockets will not be negatively affected, i.e., pulled apart by a suction effect of the air flow.

The use of separators, especially of separator pockets, made preferably of PE foil, has the special advantage that the lead plates after completion of treatment no longer must be repacked. Other climate-active membranes used as separator materials must otherwise be removed and the plates must then be provided for their final use within the lead/acid battery with a respective separator material.

The inventive method provides an extremely effective and economic measure for producing lead plates for lead/acid batteries.

The invention also suggests a device for performing the inventive method. The inventive device comprises three climate-controlled areas, connectable to one another, a transport device, for transporting the lead plates from an inlet to a removal device for removing the cured lead plates through the at least three climate-controlled areas, whereby a control unit with control members for environmental (climate) parameters such as temperature, humidity, and/or air movements (air flow) is provided.

The inventive device comprises at least three climate-controlled areas which may be in the form of climate chambers. They are arranged such that they can be, for example, loaded through a climate lock whereby the climate lock can be provided by mechanical means or by providing respective air flows, especially when the chambers are involved in a continuous manufacturing process. The plates are moved through each chamber by a transport device at a predetermined velocity along a predetermined travel path so that the total exposure time in the respective chamber is ensured. A transport device in the form of a steel band, chain, rail system or track system etc. is provided to ensure a constant transporting speed. Of course, it is also possible to provide resting periods within the chambers. The lead plates leave the chambers to enter the respectively adjacently arranged chamber and are there exposed to the subsequent climate-controlled atmosphere. In general, it is desirable that the at least three chambers are connected to one another, however, they can also be arranged separate from one another when the plates are to be subjected to an intermediate resting climate.

Advantageously, the device also includes a control unit for controlling the environmental (climate) conditions such as temperature, humidity, and/or air movement. The control of other climate parameters can be provided. Accordingly, the control unit activates the respective control member for controlling, for example, heating devices, steam nozzles, vacuum devices, suction or blowing devices, air vents etc.

Advantageously, it is suggested that the device comprises transport boxes in which a plurality of lead plates provided with the paste are positioned substantially parallel at a required distance to one another and in the necessary alignment. With such transport boxes an entire group of plates can be simultaneously exposed to the respective climate-controlled area.

The present invention also provides a novel lead plate for lead/acid batteries with respect to excellent grate-paste attachment and with respect to a high cured paste stability.

The inventive method and the inventive device are simple and can be performed or produced economically. They simplify and improve considerably the manufacture of lead plates with respect to technical and economical aspects.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will be described in detail with the aid of several specific embodiments utilizing FIGS. 1 through 4.

Figure 1:
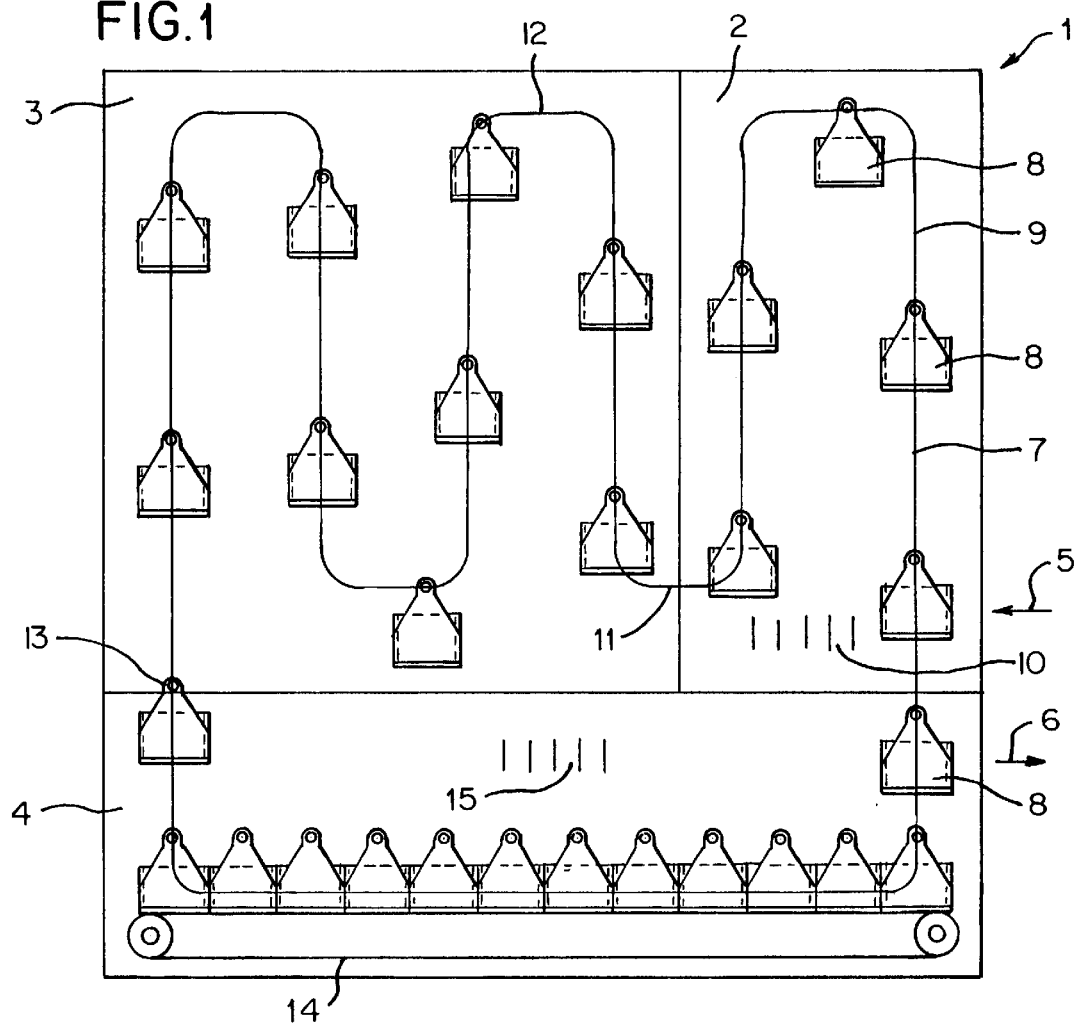
FIG. 1 shows a schematic representation of one embodiment of the inventive lead plate treatment device.

FIG. 1 shows a treatment unit 1 which in the shown embodiment comprises a curing chamber 2, a pre-drying chamber 3, and a final drying chamber 4. The curing chamber 2 can be accessed via the inlet 5 while the removal of the cured lead plates takes place via the removal device 6 at the end of the final drying chamber 4.

Figure 2:
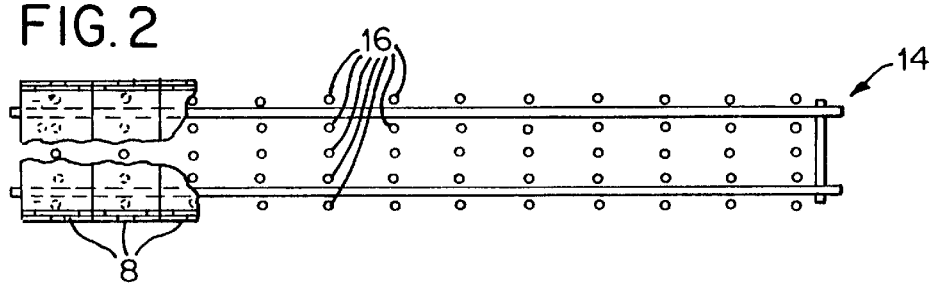
FIG. 2 shows a schematic detail of the transport device (conveyor) for the final drying step shown in FIG. 1.

Above the inlet 5 for the green lead plates transport boxes 8 are fastened to the transport unit 7, for example, a circulating track, chain, rope or cable system etc. The transport boxes 8 move along the transport path 9 at a predetermined velocity through the curing chamber 2. In the shown embodiment the transport boxes 8 are moved vertically in a continuous elevator system to the transfer station 11 while through the bottom steam is introduced via the steam inlet 10 into the curing chamber 2. An air flow is not produced. The vertically positioned plates which are spaced relative to one another within the boxes 8 are thus exposed with all their surface areas to the steam. After leaving the curing chamber 2 at the transfer station 11, the lead plates are introduced into the pre-drying chamber 3 where they are guided along the transport path 12 to the transfer station 13. Via non-represented devices an air flow, optionally of fresh air, is generated. Downstream of the transfer station 13 the boxes 8 are introduced into the final drying chamber 4 where a directed surface treatment by an air flow is produced. In all chambers the temperature is controlled by non-represented means. Optionally, this is achieved by air or steam. In the shown embodiment, a directed air flow is produced above the conveyor belt 14 which, as shown in FIG. 2, has air nozzles 16 through which an air flow 15 can be directed onto the plate surfaces.

Figure 3:
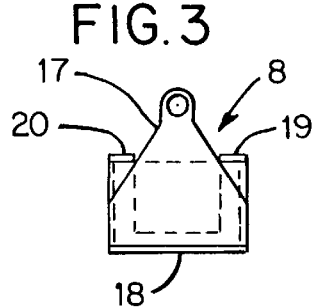
FIG. 3 shows a side view of an embodiment for a transport box.
Figure 4:
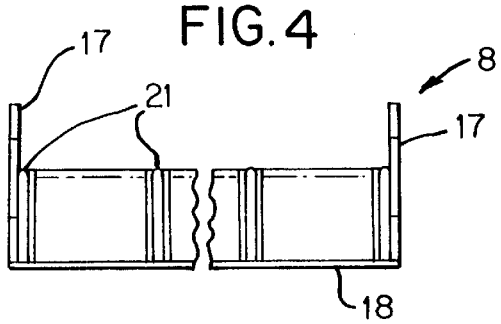
FIG. 4 shows a front view of the transport box according to FIG. 3.

As shown in FIGS. 3 and 4, the boxes 8 have a sidewall 17 and a bottom 18. Optionally, a back wall at one other side thereof is provided. In any case, one side is open so that the positive or negative plate 19, 20 can be introduced from a front side into the box 8. In one embodiment, between the plates 19, 20 spacers 21 can be inserted in order to keep the plate surfaces free for exposure to the climate in the chambers.

The shown and disclosed embodiments serve for explanation purposes only and are not limiting. In particular, the chambers can be arranged in any desired manner or combination above or adjacent to one another. Furthermore, the chambers are shown such that they are positioned directly adjacent to one another. A special arrangement of the chambers relative to one another, however, is within any design conceivable by a person skilled in the art. It is also possible to provide further chambers, for example, additional resting chambers, intermediate storage chambers etc.

The present invention is, of course, in no way restricted to the specific disclosure of the specification and drawings, but also encompasses any modifications within the scope of the appended claims.

What is claimed is:

1. A method for manufacturing lead plates for a lead/acid battery, said method comprising the steps of:
    A) providing lead electrode grates;
    B) filling an active paste into the lead electrode grates to form filled lead plates;
    C) sequentially subjecting both lateral surfaces of the filled lead plates to a continuous processing sequence of less than 6 hours under preselected processing parameters for time, temperature, humidity, and air movement, wherein the processing sequence comprises:
        C1) a curing step in which moisture is added to reach a first humidity value, wherein curing is carried out for 1 hour at temperatures between 50 and 95° C. and with direct moisture supply;
        C2) a pre-drying step for reducing the amount of free lead in the active paste at a second humidity value that is lower than the first humidity value of step C1),
        C3) a final drying step.

2. A method according to claim 1, further including the step of applying a climate-active membrane to the lateral surfaces of the lead plates before carrying out step C).

3. A method according to claim 1, wherein in step C1) no air movement is produced.

4. A method for manufacturing lead plates for a lead/acid battery, said method comprising the steps of:
    A) providing lead electrode grates;
    B) filling an active paste into the lead electrode grates to form filled lead plates;
    C) sequentially subjecting both lateral surfaces of the filled lead plates to a continuous processing sequence of less than 6 hours under preselected processing parameters for time, temperature, humidity, and air movement, wherein the processing sequence comprises:
        C1) a curing step in which moisture is added to reach a first humidity value;
        C2) a pre-drying step for reducing the amount of free lead in the active paste at a second humidity value that is lower than the first humidity value of step C1),
        C3) a final drying step;
    wherein step C1) includes introducing saturated steam at a bottom of a curing chamber in which step C1) takes place and wherein the first humidity value is about 100%.

5. A method for manufacturing lead plates for a lead/acid battery, said method comprising the steps of:
    A) providing lead electrode grates;
    B) filling an active paste into the lead electrode grates to form filled lead plates;
    C) sequentially subjecting both lateral surfaces of the filled lead plates to a continuous processing sequence of less than 6 hours under preselected processing parameters for time, temperature, humidity, and air movement, wherein the processing sequence comprises:
        C1) a curing step in which moisture is added to reach a first humidity value;
        C2) a pre-drying step for reducing the amount of free lead in the active paste at a second humidity value that is lower than the first humidity value of step C1),
        C3) a final drying step;
    wherein step C2) is carried out for ≦3 hours with air movement.

6. A method for manufacturing lead plates for a lead/acid battery, said method comprising the steps of:
    A) providing lead electrode grates;
    B) filling an active paste into the lead electrode grates to form filled lead plates;
    C) sequentially subjecting both lateral surfaces of the filled lead plates to a continuous processing sequence of less than 6 hours under preselected processing parameters for time, temperature, humidity, and air movement, wherein the processing sequence comprises:
        C1) a curing step in which moisture is added to reach a first humidity value;
        C2) a pre-drying step for reducing the amount of free lead in the active paste at a second humidity value that is lower than the first humidity value of step C1),
        C3) a final drying step;
    wherein step C3) is carried out for <60 min. with a directed air movement of 0.5 to 10 m/sec. and a temperature of 40 to 90° C.

7. A method according to claim 6, wherein the directed air movement is 2 to 3 m/sec. and the temperature is 80° C.

8. A method according to claim 1, wherein in step C) the lead plates are guided through climate-controlled areas in which steps C1), C2), and C3) are performed.

9. A method according to claim 8, wherein step C) includes transporting the lead plates by a transport device and wherein the processing times of steps C1), C2) and C3) are defined by a length of a travel path and a transport speed through the climate-controlled areas.

10. A method according to claim 1, further including the step of arranging the lead plates parallel to one another and spaced to one another in packages before carrying out step C).

11. A method according to claim 1, further including the step of applying a climate-active membrane to the lateral surfaces of the lead plates before carrying out step C), wherein the climate-active membranes are battery separators.

12. A method according to claim 11, wherein the battery plate separators consist of a polyethylene foil and are in the form of a sheet or a pocket.

13. A method according to claim 11, including the step of moistening the membranes before step C1).

14. A method according to claim 1, including the step of arranging the number of lead plates required for a battery in a package before or after step C).

15. A lead plate produced according to claim 1.

* * * * *

UNITED STATES PATENT AND TRADEMARK OFFICE
CERTIFICATE OF CORRECTION

PATENT NO : 6,014,798
DATED : 01/18/00
INVENTOR(S): Werner Nitsche, Norbert Lahme It is certified that error appears in the above-identified patent and that said Letters Patent are hereby corrected as shown below:

On the Title page, the following Item should read as follows:

[73] Assignee:

Accumulatorenwerke Hoppecke Carl Zoellner & Sohn GmbH & Co. KG

Signed and Sealed this

First Day of May, 2001

Attest:

NICHOLAS P. GODICI

Attesting Officer       Acting Director of the United States Patent and Trademark Office